(12) United States Patent
Anderson et al.

(10) Patent No.: US 8,666,550 B2
(45) Date of Patent: Mar. 4, 2014

(54) AUTONOMOUS CUTTING ELEMENT FOR SCULPTING GRASS

(75) Inventors: Noel Wayne Anderson, Fargo, ND (US); Anthony Bryant Annibale, Raleigh, NC (US)

(73) Assignee: Deere & Company, Moline, IL (US)

( * ) Notice: Subject to any disclaimer, the term of this patent is extended or adjusted under 35 U.S.C. 154(b) by 561 days.

(21) Appl. No.: 12/652,336

(22) Filed: Jan. 5, 2010

(65) Prior Publication Data

US 2011/0166705 A1 Jul. 7, 2011

(51) Int. Cl.
*G05B 19/18* (2006.01)
*B62D 57/032* (2006.01)
*B25J 9/16* (2006.01)

(52) U.S. Cl.
CPC ............ *B62D 57/032* (2013.01); *B25J 9/1666* (2013.01)
USPC .......................................... 700/253; 700/255

(58) Field of Classification Search
USPC ................ 701/28, 36, 50; 700/253, 255, 259; 901/1, 49, 50; 56/13.7
See application file for complete search history.

(56) References Cited

U.S. PATENT DOCUMENTS

| | | | |
|---|---|---|---|
| 3,698,523 A * | 10/1972 | Bellinger | 192/12 BA |
| 3,805,497 A | 4/1974 | Ross | |
| 4,622,746 A | 11/1986 | Appelson | |
| 4,777,785 A * | 10/1988 | Rafaels | 56/10.2 A |
| 5,204,814 A * | 4/1993 | Noonan et al. | 701/25 |
| 6,427,429 B1 | 8/2002 | Brabenec | |
| 6,611,738 B2 * | 8/2003 | Ruffner | 701/23 |
| 7,350,344 B2 | 4/2008 | Heinz et al. | |
| 7,356,547 B2 | 4/2008 | Ozer et al. | |
| 2001/0002533 A1 | 6/2001 | Rhody et al. | |
| 2002/0011056 A1* | 1/2002 | Lely et al. | 56/10.2 E |
| 2003/0184747 A1* | 10/2003 | Diekhans et al. | 356/300 |
| 2004/0006958 A1* | 1/2004 | Thiemann et al. | 56/10.2 R |
| 2007/0260394 A1* | 11/2007 | Dean | 701/207 |

FOREIGN PATENT DOCUMENTS

| | | |
|---|---|---|
| DE | 19800524 | 1/1998 |
| EP | 1709859 | 3/2006 |
| EP | 1709859 A1 * | 10/2006 |
| EP | 1813142 | 12/2006 |

OTHER PUBLICATIONS

European Search Report, Aug. 26, 2011, 7 pgs, appication No. 10195282.8.

* cited by examiner

*Primary Examiner* — James Trammell
*Assistant Examiner* — Daniel L Greene
(74) *Attorney, Agent, or Firm* — Yee & Associates, P.C.

(57) ABSTRACT

An apparatus comprises a vehicle, a sensing unit, and a control unit. The vehicle is movable in a path and has a first number of cutting elements. The sensing unit detects an obstacle in the path. The control unit is connected to the first number of cutting elements and is configured to autonomously adjust a height of a second number of cutting elements of the first number of cutting elements in response to the sensing unit detecting the obstacle in the path.

35 Claims, 10 Drawing Sheets

AUTONOMOUS CUTTING ELEMENT FOR SCULPTING GRASS

FIELD OF THE INVENTION

The present disclosure relates generally to systems and methods for control systems, and more particularly, to systems and methods for cutting element control. Still more specifically, the present disclosure relates to a method and system for a cutting element for sculpting grass.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. These robotic devices may have an integrated navigation system for performing the variety of different tasks in semi-autonomous or fully autonomous modes.

As robotic devices are able to perform physical tasks autonomously, human intervention and supervision of the robotic devices is often not necessary. For fully autonomous robotic devices, nearly no human intervention is necessary. The lack of human intervention and supervision may be desirable in many cases. However, the lack of human intervention and supervision also presents issues that the robotic device may need to be capable of handling.

SUMMARY

An embodiment of the present invention provides an apparatus comprising a vehicle, a sensing unit, and a control unit. The vehicle is movable in a path and has a first number of cutting elements. The sensing unit may detect an obstacle in the path. The control unit is connected to the first number of cutting elements and may be configured to autonomously adjust a height of a second number of cutting elements of the first number of cutting elements in response to the sensing unit detecting the obstacle in the path.

Another embodiment of the present invention provides a method for controlling cutting elements in a vehicle. The method comprises moving a vehicle having a first number of cutting elements in a path, detecting an obstacle in the path; and autonomously adjusting a height of a second number of cutting elements of the first number of cutting elements in response to detecting the obstacle in the path.

Yet another embodiment of the present invention provides a computer program product comprising a computer readable storage medium and program code, stored on the computer readable storage medium. The program code includes instructions for moving a vehicle having a first number of cutting elements in a path, instructions for detecting an obstacle in the path, and instructions for autonomously adjusting a height of a second number of cutting elements of the first number of cutting elements in response to detecting the obstacle in the path.

Still yet another embodiment of the present invention provides a vehicle comprising a plurality of cutting elements, a sensing unit, a processor unit, and a control unit. The vehicle may be movable on a path. The sensing unit may be configured to detect an obstacle in the path, a position of the obstacle in the path, a size of the obstacle in the path, and a distance between the plurality of cutting elements and the obstacle. The processor unit may be configured to determine a number of cutting elements to be autonomously adjusted, a height for each of the number of cutting elements to be autonomously adjusted, and a timing for each of the number of cutting elements to be autonomously adjusted. The control unit may be connected to the plurality of cutting elements. The control unit may be configured to autonomously adjust each of the number of cutting elements of the plurality of cutting elements according to the height and the timing determined for each of the number of cutting elements.

The features, functions, and advantages can be achieved independently in various embodiments of the present invention, or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
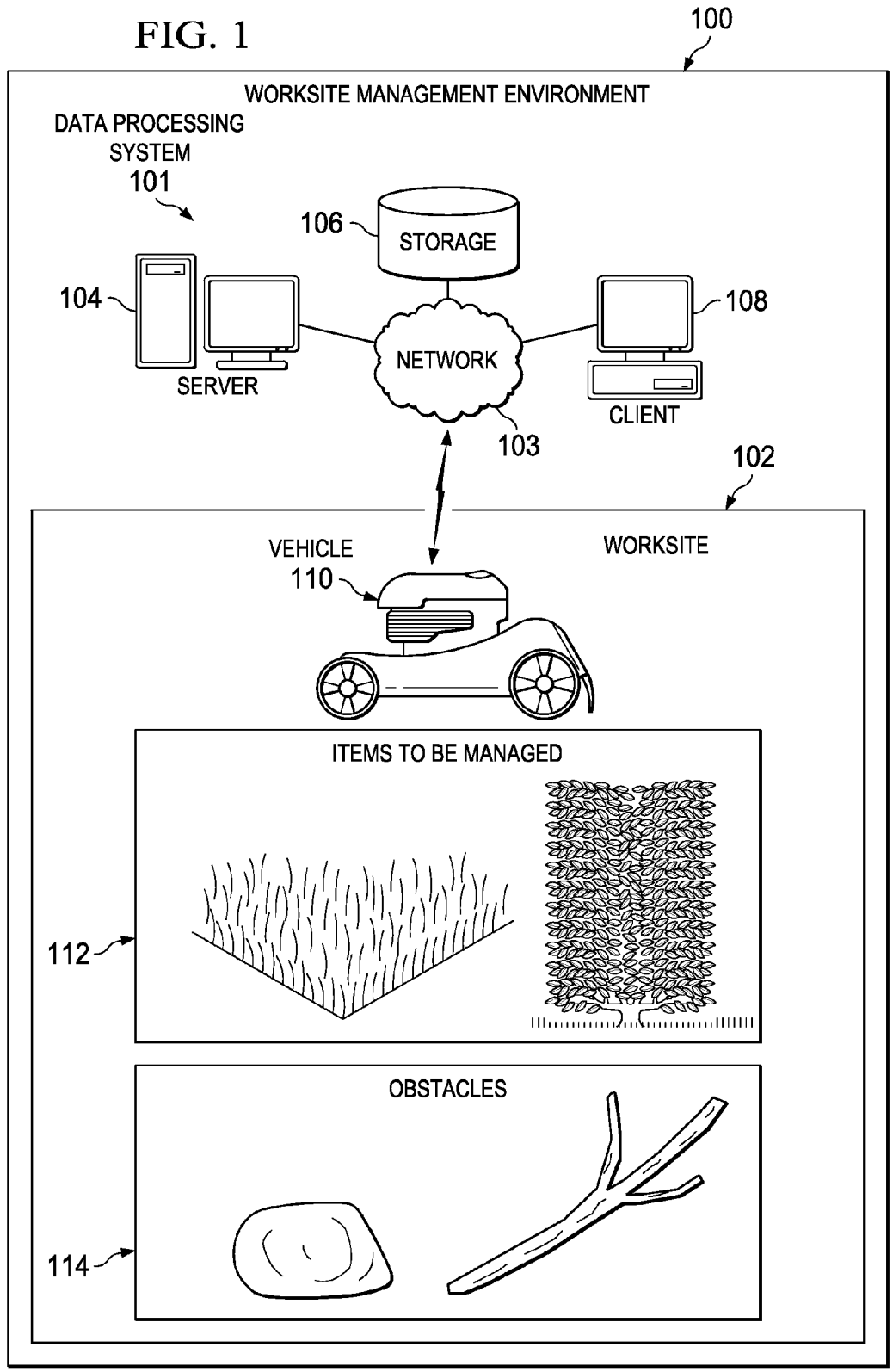
FIG. 1 is an illustration of a worksite management environment in which an illustrative embodiment may be implemented.

With reference now to FIG. 1, an illustration of a worksite management environment is depicted in which an illustrative embodiment may be implemented. In this illustrative example, worksite management environment 100 includes network data processing system 101 and worksite 102.

Network data processing system 101 is a network of computers in which embodiments may be implemented. Network data processing system 101 contains network 103, which is the medium used to provide communication links between various devices and computers connected together within network data processing system 101. Network 103 may include connections, such as wire, wireless communication links, or fiber optic cables.

In the depicted example, server 104 connects to network 103 along with storage unit 106. In addition, client 108 connects to network 103. Client 108 may be, for example, one or more personal computers or network computers. In the depicted example, server 104 provides data, such as boot files, operating system images, and applications to client 108. Client 108 is a client to server 104 in this example. Vehicle 110 is also a client that may exchange information with client 108. Vehicle 110 also may exchange information with server 104. Vehicle 110 may exchange data with different computers through a wireless communications link while in-motion or any other type of communications link while at rest. In these examples, server 104, and client 108 may be computers. Network data processing system 101 may include additional servers, clients, and other devices not shown.

In the depicted example, network data processing system 101 is the Internet with network 103 representing a worldwide collection of networks and gateways that use the Transmission Control Protocol/Internet Protocol (TCP/IP) suite of protocols to communicate with one another. Of course, network data processing system 101 also may be implemented as a number of different types of networks, such as for example, an intranet, a local area network (LAN), or a wide area network (WAN).

Worksite management environment 100 further includes worksite 102 to be managed by vehicle 110 and/or a number of vehicles. For example, worksite 102 may be a structure, building, area, yard, golf course, indoor environment, outdoor environment, and/or any other suitable worksite or combination of worksites. Vehicle 110 may be any type of vehicle including, without limitation, a mower, a tractor, a semi-autonomous vehicle, a fully autonomous vehicle, a mobile robotic machine, a service robot, a field robot, a robotic mower, and/or any other autonomous vehicle.

As used herein, a vehicle may be considered to be "autonomous" by being capable of operating independently without human intervention, aid, and/or supervision. Thus, a vehicle may be "autonomous" in that it is capable of performing a task without human intervention, aid, and/or supervision. Also as used herein, a vehicle may be considered to be "semi-autonomous" by being capable of performing only some or part of tasks without human intervention, aid, and/or supervision.

In this depicted example, worksite 102 includes items to be managed 112. Items to be managed 112 may be managed by vehicle 110 and/or any number of different vehicles. For example, without limitation items to be managed 112 may include at least one of grass, trees, shrubs, and/or any other suitable item to be managed or combination of items. Worksite 102 further includes obstacles 114 which may present issues in the management of worksite 102. For example, without limitation obstacles may include at least one of any number of rocks, roots, branches, sprinkler system components, animals, human beings, and/or any other obstacles that may present issues in the management of worksite 102.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C, or item B and item C.

FIG. 1 is intended as an example, and not as an architectural limitation for different embodiments. It should be appreciated that FIG. 1 is only exemplary and is not intended to assert or imply any limitation with regard to the environments in which different embodiments may be implemented. Many modifications to the depicted environments may be made.

The different illustrative embodiments recognize and take into account a number of different considerations. For example, the different illustrative embodiments recognize and take into account that obstacles in the path of the mower may cause problems for the mower and/or the obstacles. The different illustrative embodiments recognize that one solution may involve a deck of mowing blades that is capable of being raised and lowered manually. However, manual tasks may not be desired in some cases. Further, raising and lowering of an entire deck of mowing blades may result in an area of unmown grass around the obstacle that may need to be separately managed. Separate management of areas can increase the time and energy expended.

The different illustrative embodiments further recognize and take into account that another solution may involve a deck of mowing blades that is capable of being stopped and restarted manually. However, manual tasks may not be desired in some cases. Further, stopping and restarting of an entire deck of mowing blades may result in an area of unmown grass around the obstacle that may need to be separately managed. Separate management of areas can increase the time and energy expended.

The different illustrative embodiments further recognize and take into account that it may be desirable to sculpt grass into designs. The different illustrative embodiments recognize that one solution may involve manual sculpting of grass. However, as discussed, manual tasks may not be desired in some cases. Further, manual sculpting may result in design inconsistencies due to manual operation errors. While physical boundaries and/or stenciling may be incorporated to reduce design inconsistencies, these methods may require additional preparation time and costs.

Thus, the different illustrative embodiments provide a method and apparatus for an autonomous cutting element for sculpting grass. In one illustrative embodiment, an apparatus comprises a vehicle, a sensing unit, and a control unit. The vehicle is movable in a path and has a first number of cutting elements. The sensing unit detects an obstacle in the path. The control unit is connected to the first number of cutting elements and is configured to autonomously adjust a height of a second number of cutting elements of the first number of cutting elements in response to the sensing unit detecting the obstacle in the path.

The different illustrative embodiments further provide an apparatus comprising a computer readable storage medium and a processor unit. The computer readable storage medium stores program code for a design to be formed into a pattern. The processor unit executes the program code. The program code, when executed by the processor unit, is adapted to cause a control unit to autonomously control a plurality of cutting elements to form the pattern.

Figure 2:
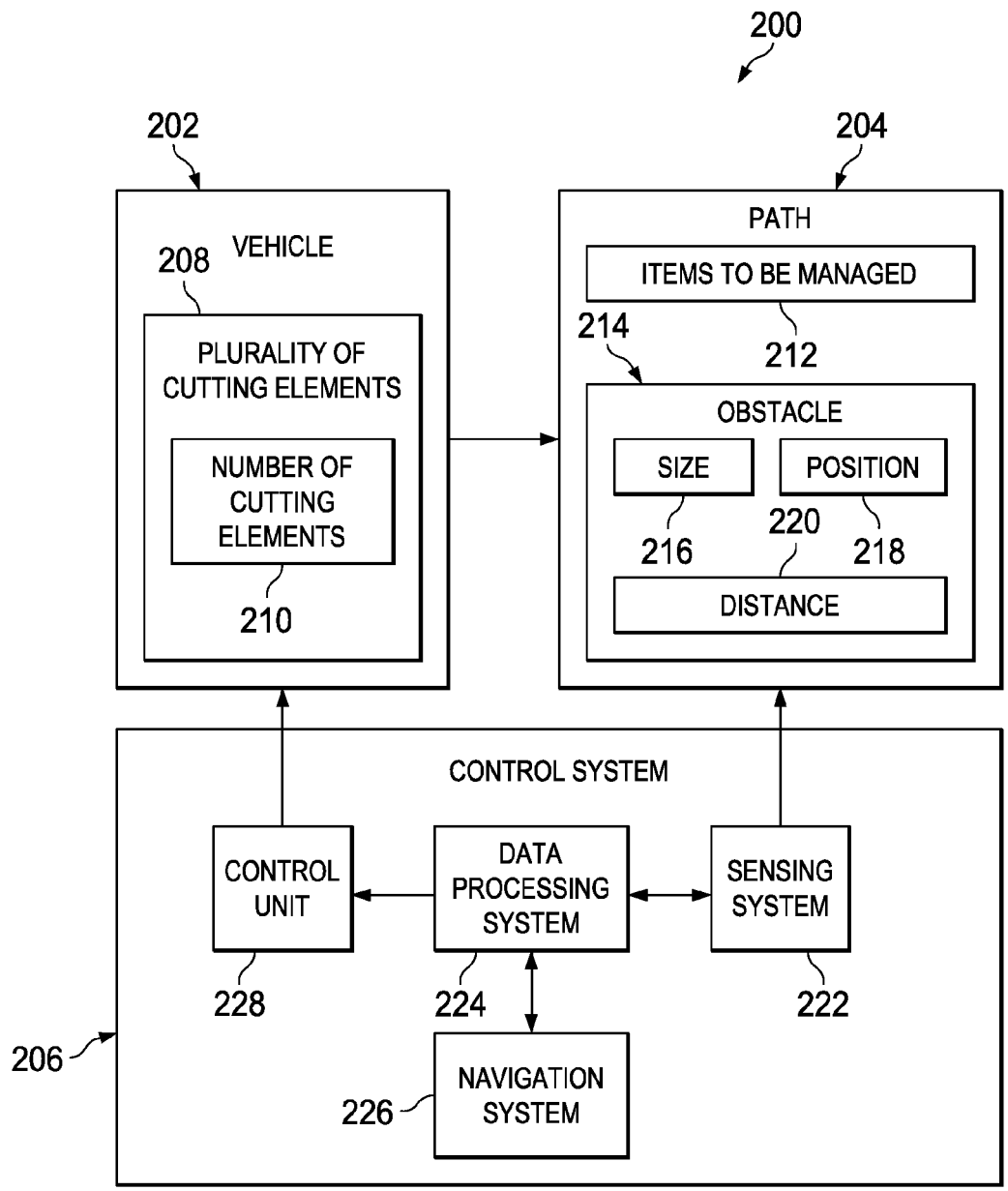
FIG. 2 is an illustration of a worksite management environment in accordance with an illustrative embodiment.

With reference now to FIG. 2, an illustration of a worksite management environment is depicted in accordance with an illustrative embodiment. In this illustrative example, worksite management environment 200 includes vehicle 202, path 204 and control system 206. Vehicle 202 may be an example of one implementation of vehicle 110 in FIG. 1.

Vehicle 202 includes plurality of cutting elements 208. As used herein, a plurality, when referring to items, is at least more than one item. Plurality of cutting elements 208 are connected to vehicle 202. For example, plurality of cutting elements 208 may be connected underneath vehicle 202, near the ground. For example, with out limitation, plurality of cutting elements 208 may be blades and/or wires that rotate at a speed to cut grass and/or other items beneath vehicle 202. Plurality of cutting elements 208 may be comprised of any metal, graphite, and/or plastic materials suitable for cutting. Plurality of cutting elements 208 may also be comprised of non-solid cutting elements including, without limitation, laser and/or high pressure fluid.

As used herein, a first component may be considered to be connected to a second component by being secured to the second component, bonded to the second component, fastened to the second component, and/or connected to the second component in some other suitable manner. The first component also may be connected to the second component through using a third component. The first component may also be considered to be connected to the second component by being formed as part of, and/or an extension of, the second component.

In this illustrative example, plurality of cutting elements 208 includes number of cutting elements 210. As used herein, "number" when referring to items is at least one or more items. For example, plurality of cutting elements 208 may include two or more individual cutting elements. Number of cutting elements 210 may include as few as one cutting element, but no more cutting elements than are included in plurality of cutting elements 210. For example, without limitation, plurality of cutting elements 208 may include four individual cutting elements, while number of cutting elements 210 includes anywhere from one to four individual cutting elements of plurality of cutting elements 208. In another example, vehicle 202 may have a first number of cutting elements, while number of cutting elements 210 may be a second number of cutting elements. Also, the cutting elements of the first number of cutting elements may be the same as the second number of cutting elements. Thus, for example, vehicle 202 may have as few as one cutting element in vehicle 202 that may be autonomously controlled.

In this example, vehicle 202 may move on path 204. Path 204 may be an area being approached by vehicle 202. For example, without limitation, path 204 may be a width of a portion of lawn to be mown by vehicle 202 according to a plan. Path 204 includes items to be managed 212. Items to be managed 212 may be an example of items to be managed 112 in FIG. 1. Items to be managed 212 may be on path 204 and may be managed by vehicle 202. In one example, items to be managed 212 may be grass and path 204 may be a path in a lawn that is mown by vehicle 202.

In this illustrative example, path 204 further includes obstacle 214. Obstacle 214 may be one of a number of obstacles on path 204, such as obstacles 114 in FIG. 1. Obstacle 214 is anything on path 204 that may present issues as vehicle 202 moves on path 204. These issues may be present for plurality of cutting elements 208, vehicle 202, and/or obstacle 214 as vehicle 202 moves on path 204. Without limitation, these issues may relate to anything from safety and/or damage to appearance and/or aesthetics. For example, obstacle 214 may be an obstacle on path 204 that vehicle 202 is moving towards. If plurality of cutting elements 208 were to strike obstacle 214 on path 204, damage may be caused to plurality of cutting elements 208, vehicle 202, obstacle 214 and/or anything else in the surrounding area.

As depicted, obstacle 214 has size 216, position 218, and distance 220. Size 216 of obstacle 214 may be dimensions of obstacle 214 such as for example height, width, length, gradient, slope, and/or any other ascertainable dimensions. Position 218 is a position of obstacle 214 on path 204. Position 218 may also be a function of size 216 of obstacle 214 on path 204. For example, position 218 may be only a portion of path 204. Alternatively, obstacle 214, and thus position 218 of obstacle 214 on path 204, may be larger than path 204 and/or include portions not on path 204. Further, obstacle 214 has distance 220. In this example, distance 220 is a distance between obstacle 214 and plurality of cutting elements 208.

As illustrated, worksite management environment 200 includes control system 206. Control system 206 may be configured to control vehicle 202 and/or plurality of cutting elements 208. In this example, control system 206 includes sensing system 222, data processing system 224, navigational system 226, as well as control unit 228.

In this illustrative example, sensing system 222 is configured to detect obstacles 214 that may present issues for vehicle 202. Sensing system 222 may be used to detect any or all of size 216, position 218, and distance 220 of obstacle 214. In this example, sensing system 222 is further configured to send this information to data processing system 224. Sensing system 222 may include a number of different sensing devices. Sensing system 222 may be connected to, and/or located on, vehicle 202. Alternatively, sensing system 222 may be located entirely separate from vehicle 202. Additionally, sensing system 222 may include both devices located on vehicle 202 and devices located separate from vehicle 202.

In this illustrative example, data processing system 224 is connected to sensing system 222, navigational system 226, as well as control unit 228. Data processing system 224 may be an example of one implementation of network data processing system 101 in FIG. 1. Data processing system 224 may be connected to, and/or located in, vehicle 202. Alternatively, data processing system 224 may be located entirely separate from vehicle 202 and be connected to vehicle 202 via a wireless connection. Additionally, data processing system 224 may include both components located on vehicle 202 and components located separate from vehicle 202.

In this example, navigation system 226 provides a system for controlling the mobility, positioning, and navigation for vehicle 202. Navigation system 226 may be used to plan and/or navigate tasks for planning of path 204 and worksite area coverage in worksite management environment 200. Navigation system 226 may be integrated with sensing system 222 to aid in the navigation of vehicle 202. For example, navigation system 226 may use data received from any number of sensing devices of sensing system. Navigation system 226 may also run independently of sensing system 222.

Control system 206 further includes control unit 228. Control unit 228 is connected to plurality of cutting elements 208. Control unit 228 is configured to control each cutting element in plurality of cutting elements 208 individually, or as part of a group of cutting elements. For example, without limitation, control unit 228 may be configured to raise, lower, and/or adjust a height of each cutting element in plurality of cutting elements 208. Further, control unit 228 may be configured to stop and/or start cutting by each cutting element in plurality of cutting elements 208. Additionally, control unit 228 may be configured to adjust an angle that each cutting element in plurality of cutting elements 208 cuts items to be managed 212.

In these illustrative examples, control unit 228 may comprise a number of devices used to adjust and/or control each of plurality of cutting elements 208. For example, control unit 228 may comprise electrical devices, mechanical devices, pneumatic devices, hydraulic devices, electrostatic devices, electromagnetic devices and/or any other suitable device for adjusting and/or controlling cutting elements in a vehicle.

The illustration of worksite management environment 200 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, control system 206 may not include navigation system 226. Vehicle 202 may be a semi-autonomous vehicle and may not require navigation system 226. Alternatively, vehicle 202 may be a fully-autonomous vehicle and may rely on navigation system 226 to insure planning of path 204 and worksite area coverage in worksite management environment 200. In other illustrative embodiments, control system 206 may be located entirely in vehicle 202. Alternatively, control system 206 may be located entirely separate from vehicle 202 and interface with vehicle 202 via a wireless connection, for example. Additionally, control system 206 may include both components located on vehicle 202 and components located separate from vehicle 202.

Figure 3:
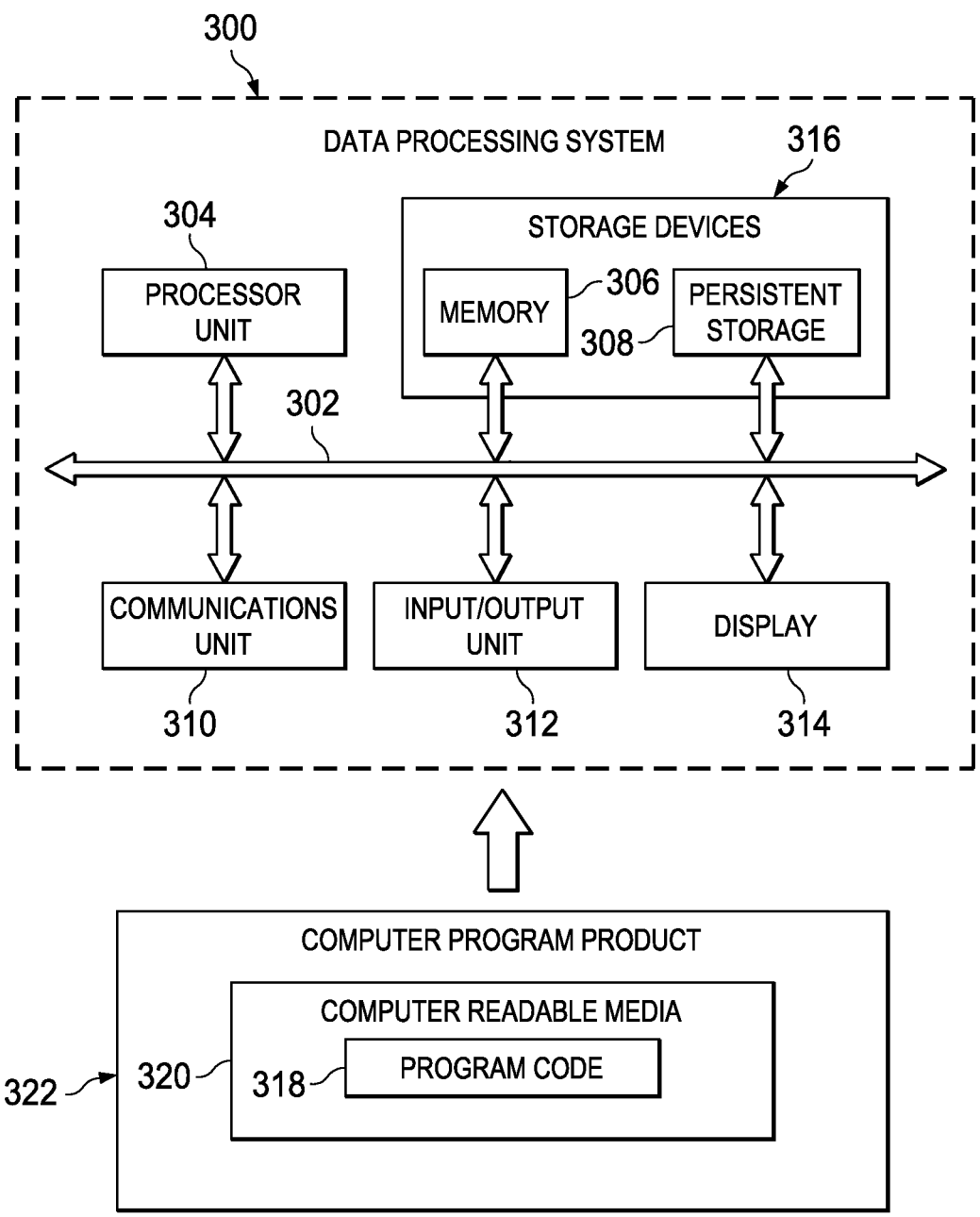
FIG. 3 is an illustration of a data processing system in accordance with an illustrative embodiment.

With reference now to FIG. 3, an illustration of a data processing system is depicted in accordance with an illustrative embodiment. Data processing system 300 is an example of a data processing system that may be used to implement servers and clients, such as server 104 and client 108 in FIG. 1. Further, data processing system 300 may be an example of one implementation of data processing system 224 in FIG. 2.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors, or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example without limitation, data, program code in functional form, and/or other suitable information either on a temporary basis and/or a permanent basis. Memory 306, in these examples, may be, for example, a random access memory, or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links. Communications unit 310 may provide for communications among vehicle 202, control system 206, sensing system 222, navigational system 226, and/or control unit 228 in FIG. 2.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto, or transferred to, data processing system 300 for execution by processor unit 304. Program code 318 and computer readable media 320 form computer program product 322 in these examples. In one example, computer readable media 320 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 320 may not be removable.

Alternatively, program code 318 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communication links or wireless transmissions containing the program code.

In some illustrative embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to, or in place of, those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308 and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

The illustration of data processing system 300 in FIG. 3 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 4:
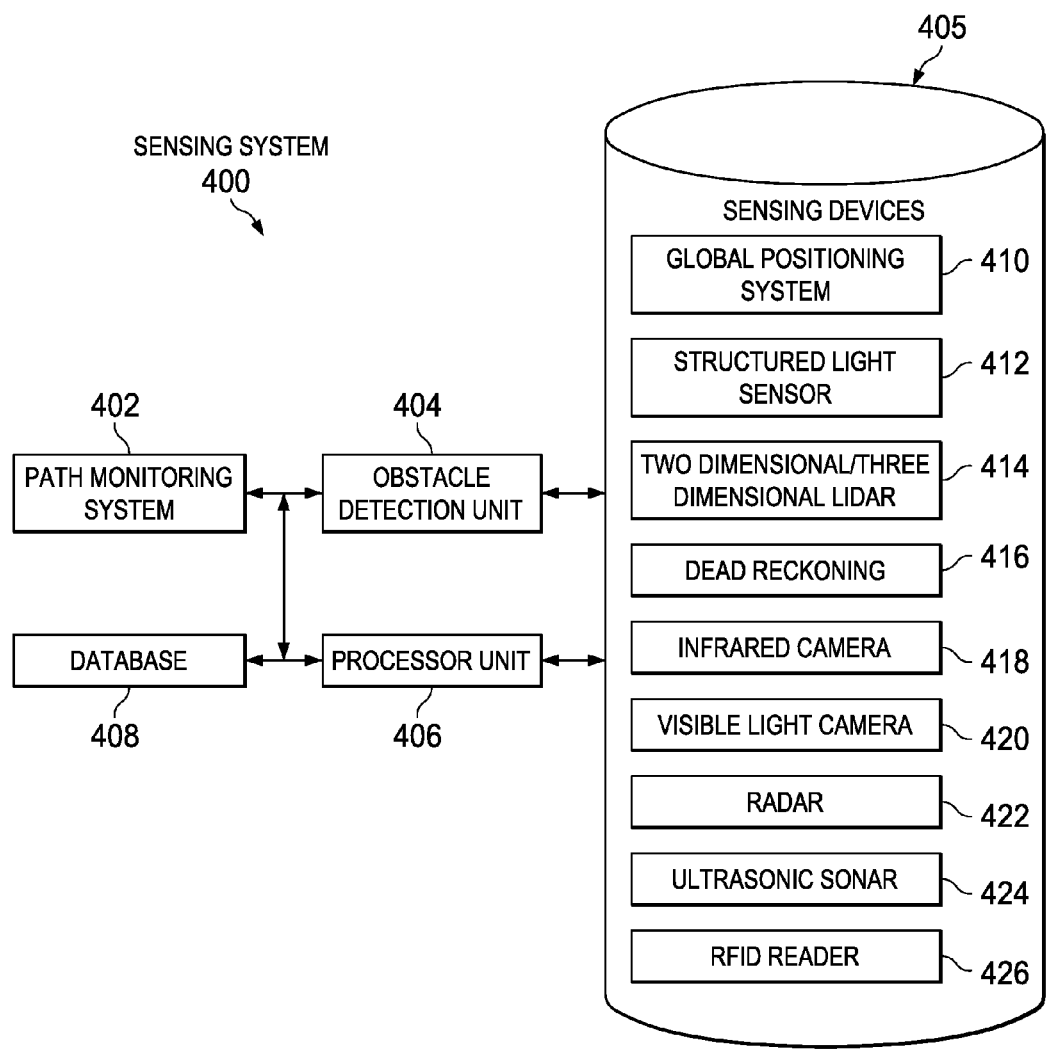
FIG. 4 is an illustration of a sensing system in accordance with an illustrative embodiment.

With reference now to FIG. 4, an illustration of a sensing system is depicted in accordance with an illustrative embodiment. Sensing system 400 may be an example of one implementation of sensing system 222 in FIG. 2. Sensing system 400 includes path monitoring system 402, obstacle detection unit 404, sensing devices 405, processor unit 406, and database 408.

Path monitoring system 402 is used to monitor a path that a vehicle moves on, such as path 204 and vehicle 202 in FIG. 2. Path monitoring system 402 acquires data regarding vehicle direction, vehicle speed, and the width of the area cut by the plurality of cutting elements. Path monitoring system 402 may acquire a sequence of positions from, for example, global positioning system 410. This acquired data may be sent to a data processing system for processing and/or storage, such as data processing system 300 in FIG. 3. For example, this data may be monitored continuously or periodically. Further, this data may be acquired as part of a predetermined navigational plan and stored in database 408.

In this illustrative example, sensing devices 405 and techniques using sensing devices 405 may be incorporated into path monitoring system 402. As illustrated, sensing system 400 includes sensing devices 405 which may include for example, global positioning system 410, structured light sensor 412, two dimensional/three dimensional lidar 414, dead reckoning 416, infrared camera 418, visible light camera 420, radar 422, ultrasonic sonar 424, and radio frequency identification reader 426. These different sensors may be used to identify the worksite environment around a vehicle. Sensing devices 405 in sensing system 400 may be selected such that one of the sensors is always capable of sensing information needed to operate the vehicle in different operating environments.

Global positioning system 410 may identify the location of the vehicle with respect to other objects and/or obstacles in the environment. Global positioning system 410 may be any type of radio frequency triangulation scheme based on signal strength and/or time of flight. Structured light sensor 412 emits light in a pattern, such as one or more lines, reads back the reflections of light through a camera, and interprets the reflections to detect and measure obstacles in the environment. Two dimensional/three dimensional lidar 414 is an optical remote sensing technology that measures properties of scattered light to find range and/or other information of a distant target. Two dimensional/three dimensional lidar 414 emits laser pulses as a beam, and then scans the beam to generate two dimensional or three dimensional range matrices. The range matrices are used to determine distance to an obstacle or surface by measuring the time delay between transmission of a pulse and detection of the reflected signal.

Dead reckoning 416 begins with a known position, which is then advanced, mathematically or directly, based upon known speed, elapsed time, and course. The advancement based upon speed may use the vehicle odometer, or ground speed radar, to determine distance traveled from the known position. Infrared camera 418 detects heat indicative of a living thing versus an inanimate object. An infrared camera may also form an image using infrared radiation. Visible light camera 420 may be a standard still-image camera, which may be used alone for color information or with a second camera to generate stereoscopic or three-dimensional images. When visible light camera 420 is used along with a second camera to generate stereoscopic images, the two or more cameras may be set with different exposure settings to provide improved performance over a range of lighting conditions. Visible light camera 420 may also be a video camera that captures and records moving images.

Radar 422 uses electromagnetic waves to identify the range, altitude, direction, or speed of both moving and fixed obstacles. Radar 422 is well known in the art, and may be used in a time of flight mode to calculate distance to an obstacle, as well as Doppler mode to calculate the speed of an obstacle. Ultrasonic sonar 424 uses sound propagation on an ultrasonic frequency to measure the distance to an obstacle by measuring the time from transmission of a pulse to reception and converting the measurement into a range using the known speed of sound. Ultrasonic sonar 424 is well known in the art and can also be used in a time of flight mode or Doppler mode, similar to radar 422. Radio frequency identification reader 426 relies on stored data and remotely retrieves the data using devices called radio frequency identification (RFID) tags or transponders.

Sensing system 400 may retrieve data from one or more of sensing devices 405 to obtain different perspectives of the worksite environment. For example, sensing system 400 may obtain visual data from visible light camera 420, data about the distance of the vehicle in relation to obstacles in the environment from two dimensional/three dimensional lidar 414, and location data of the vehicle in relation to a map from global positioning system 410.

In these illustrative examples, obstacle detection unit 404 is used to detect obstacles that may present issues for a vehicle, such as obstacle 214 and vehicle 202 in FIG. 2. Obstacle detection unit 404 uses data acquired from sensing devices 405 and/or path monitoring system 402 to identify areas where obstacles may affect operations of the vehicle. Obstacle detection unit 404 may detect obstacles by sending out and receiving a plurality of signals.

In this illustrative example, obstacle detection unit 404 may incorporate any number of sensing devices 405 to detect obstacles. For example, without limitation, obstacle detection unit 404 may incorporate ultrasonic sonar 424 or infrared camera 418 imaging to detect a density or temperature difference between grass to be mown and an obstacle that may present issues. In another example, obstacle detection unit 404 may incorporate ultrasonic sonar 424 to detect movement differences between grass that is relatively stationary and an obstacle such as an animal that may move.

In a further example, obstacles may be known and planned into a predetermined path. Path data may be stored in database 408. For example, obstacles may be located and identified by a human, by software analyzing an aerial image, by software analyzing images taken at or near ground level, and/or by sensing system 400.

Obstacle detection unit 404 is further configured to detect data regarding the size of the obstacle, the distance to the obstacle, and the position of the obstacle on the path, such as for example size 216, position 218, and distance 220 of obstacle 214 in FIG. 2. Obstacle detection unit 404 may incorporate any number of sensing devices 405, techniques using any number of sensing devices 405 as discussed above and/or any other suitable methods to detect the data about the obstacle.

Sensing system 400 is configured to send data from path monitoring system 402 and obstacle detection unit 404 to processor unit 406. Processor unit 406 may be an example of one implementation of processor unit 304 in FIG. 3. In these illustrative examples, processor unit 406 is configured to determine a number of cutting elements to be adjusted autonomously, a height for the number of cutting elements to be adjusted, a timing for the adjustment, and/or a speed of the adjustment.

In this illustrative example, data received from obstacle detection unit 404 regarding the position of the obstacle on the path and the size of the obstacle may be used to determine the number of cutting elements to be adjusted. For example, if an obstacle is narrower than the width of the area cut by the plurality of cutting elements of the vehicle, processor unit 406 may determine that only some, and not all, of the plurality of cutting elements may need to be adjusted. Further, data received regarding a position of the obstacle may be used to determine the number of cutting elements that need to be adjusted.

In this illustrative example, data received from obstacle detection unit 404 regarding the size of the obstacle may be used to determine a height for each of the number of cutting elements to be adjusted. For example, some obstacles may not have a uniform height. In order to prevent any of the plurality of cutting elements from contacting the obstacle, each of the number of cutting elements may need to be adjusted to a different height.

Further, data received from obstacle detection unit 404 regarding the size of the obstacle and the distance between the obstacle and the plurality of cutting elements may be used to determine a timing for each of the number of cutting elements to be adjusted. For example, data received regarding the distance between obstacle and the plurality of cutting elements may be used by processor unit 406 to determine a timing for raising each of the number of cutting elements. This timing for raising may be determined to insure that each cutting element is raised immediately prior to a potential contact with the obstacle. Similarly, data received regarding a length of the obstacle may be used by processor unit 406 to determine a timing for lowering each of the number of cutting elements once the obstacle has been passed over.

The data used for determining the timing may be processed by processor unit 406 in real time. For example, time delays may occur while any one of sensing devices 405 detects an obstacle, while processor unit 406 processes data and/or any data is communicated among devices in sensing system 400. Processing in real time means that any and all of these time delays are taken into account in the determination of the timing for each of the number of cutting elements to be adjusted.

Processor unit 406 may also determine a timing to stop and start each of the number of cutting elements. For example, processor unit 406 may receive data from sensing system 400 regarding a distance to an obstacle. Processor unit 406 may determine an off timing for a number of cutting elements to be turned off and stopped. The timing may be based on data regarding the speed of the vehicle, the distance to the obstacle, the speed of the cutting elements, and the time required to stop the number of cutting elements. Likewise, an on timing may also be determined by processor unit 406 for the number of cutting elements to be restarted once the obstacle has been passed by the number of cutting elements, for example.

Processor unit 406 may also determine a speed for each of the number of cutting elements to be adjusted. Data may be received from obstacle detection unit 404 regarding the size, slope, and/or gradient of the obstacle. This data may be used by processor unit 406 to determine the speed for adjusting each of the number of cutting elements. For example, for a sharp obstacle detected such as a rock or sprinkler system component, the number of cutting elements may be quickly raised and lowered. Alternatively, for an obstacle detected having a rounded surface, the cutting elements may be gradually raised and lowered.

As a result of these determinations, adjustment instructions may be sent to a control unit for the plurality of cutting elements such as control unit 228 in FIG. 2. These adjustment instructions may reduce an area and/or an obviousness of the area around an obstacle that is not cut. Thus, this area may not need to be separately managed. For example, a number of cutting elements may be individually raised and lowered using determined timing, height and speed parameters, such that a greater amount of grass is cut around an obstacle without any of the plurality of cutting elements contacting the obstacle. These adjustment instructions may reduce a visibility of the obstacle. For example, the obstacle may be a root of a tree. It may be desirable to have the root less visible. The adjustment instructions may be configured to maintain the grass around the tree and the root at a greater height to reduce the visibility of the obstacle.

The illustration of sensing system 400 in FIG. 4 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, sensing system 400 may not include processor unit 406 and/or database 408. Data may be processed and stored separately from sensing system 400. In another example, processor unit 406 may include a plurality of processor units for processing data received. In other illustrative embodiments, sensing system 400 may include any number of sensing devices 405 working simultaneously. Yet, in other illustrative embodiments, sensing system 400 may use obstacle detection unit 404. All obstacles may be programmed into a predetermined area coverage plan.

Figure 5:
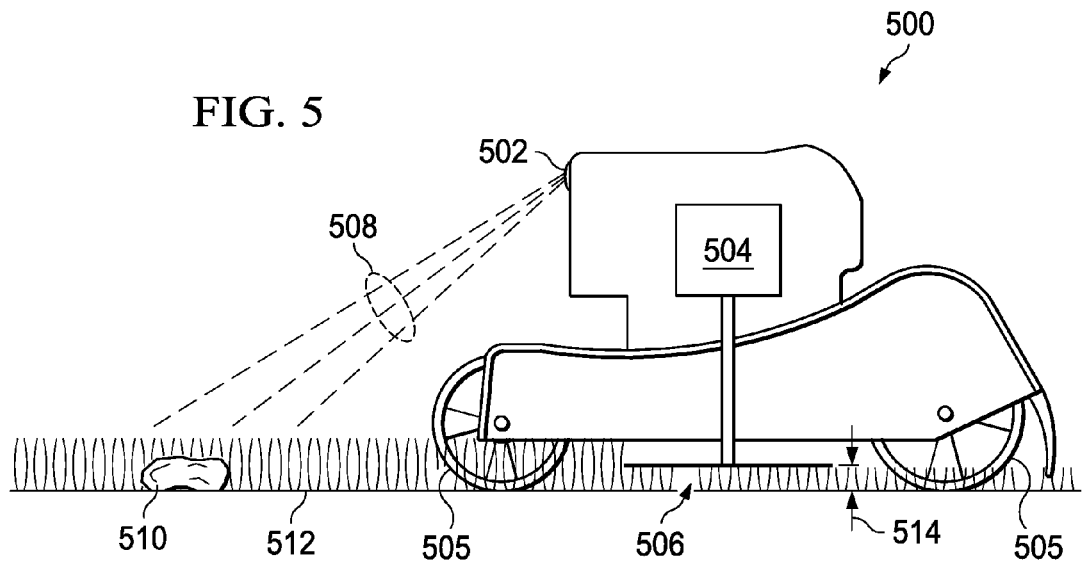
FIG. 5 is an illustration of a side view of a vehicle having a plurality of cutting elements in accordance with an illustrative embodiment.

With reference now to FIGS. 5-8, illustrations of a vehicle having a plurality of cutting elements is depicted in accordance with an illustrative embodiment. FIG. 5 illustrates a side view of a vehicle having a plurality of cutting elements in accordance with an illustrative embodiment. Vehicle 500 may be an example of one embodiment of vehicle 202 in FIG. 2. Vehicle 500 includes sensing system 502, control unit 504, plurality of cutting elements 506, and wheels 505.

Sensing system 502 may be an example of one embodiment of sensing system 222 in FIG. 2. As depicted, sensing system 502 sends and receives signals 508. Signals 508 may be used by sensing system 502 to detect obstacle 510. In this example, vehicle 500 is approaching obstacle 510. Control unit 504 is connected to plurality of cutting elements 506. Control unit 504 is configured to adjust a height of each of the plurality of the cutting elements 506. Control unit 504 may be one example of control unit 228 in FIG. 2.

In this depicted example, plurality of cutting elements 506 rotate and cut grass on the surface of path 512. As illustrated plurality of cutting elements 506 are cutting at height 514 above the surface of path 512. Height 514 may be a preselected height for a desired length of grass.

Figure 6:
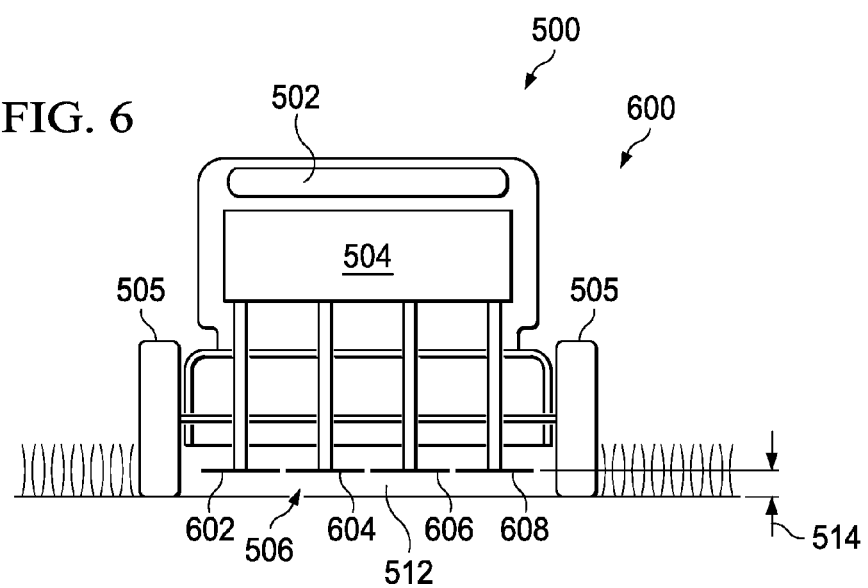
FIG. 6 is an illustration of a front view of a vehicle having a plurality of cutting elements in accordance with an illustrative embodiment.

With reference now to FIG. 6, an illustration of a front view of a vehicle having a plurality of cutting elements is depicted in accordance with an illustrative embodiment. In this illustrative example, vehicle 500 is depicted from view 600 of vehicle 500. As depicted, plurality of cutting elements 506 includes cutting elements 602, 604, 606, and 608. Each of cutting elements 602, 604, 606, and 608 are positioned height 514 above path 512. Control unit 504 is connected to each of cutting elements 602, 604, 606, and 608.

Figure 7:
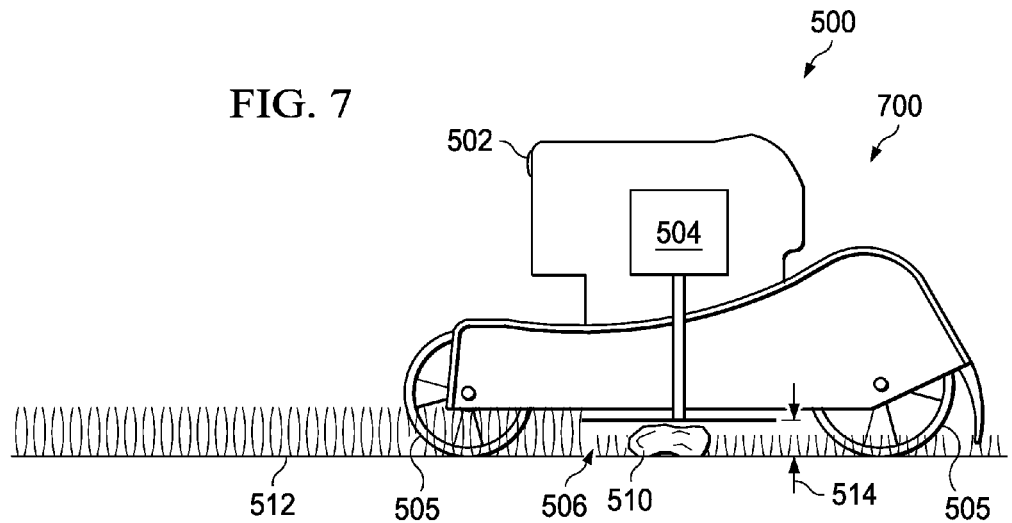
FIG. 7 is an illustration of a side view of a vehicle having a plurality of cutting elements in accordance with an illustrative embodiment.

With reference now to FIG. 7, an illustration of a side view of a vehicle having a plurality of cutting elements is depicted in accordance with an illustrative embodiment. In this illustrative example, vehicle 500 is depicted from view 700 of vehicle 500. As depicted, vehicle 500 is moving on path 512 and is moving over obstacle 510. Plurality of cutting elements 506 are height 702 above the surface of path 512. Height 702 may be a greater distance from the surface of path 512 than height 514 in FIG. 5.

Figure 8:
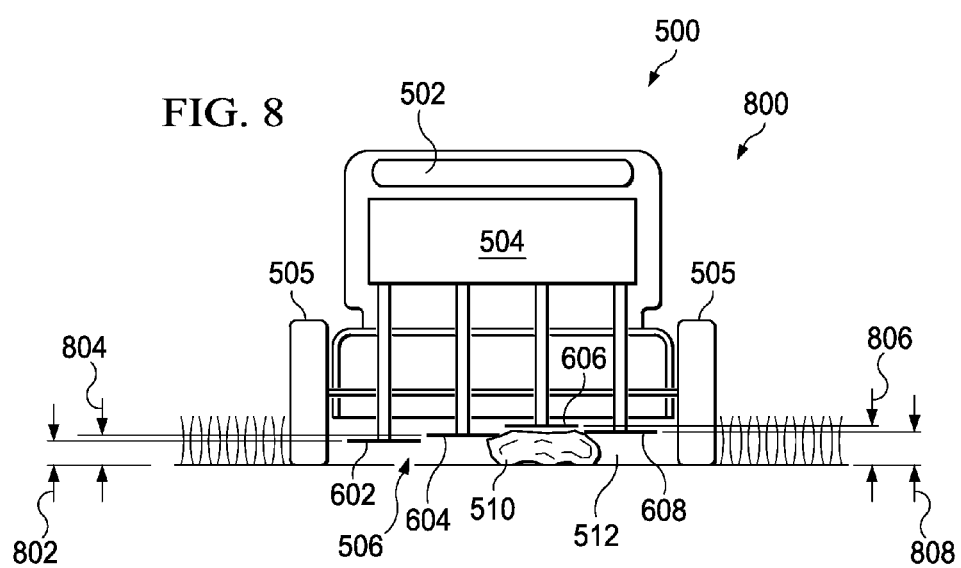
FIG. 8 is an illustration of a front view of a vehicle having a plurality of cutting elements in accordance with an illustrative embodiment.

With reference now to FIG. 8, an illustration of a front view of a vehicle having a plurality of cutting elements is depicted in accordance with an illustrative embodiment. In this illustrative example, vehicle 500 is depicted from view 800 of vehicle 500. As depicted, cutting elements 602, 604, 606, and 608 are heights 802, 804, 806, and 808, respectively, above the surface of path 512. Control unit 504 is connected to each of cutting elements 602, 604, 606, and 608. Control unit 504 may be configured to adjust the height of each of cutting elements 602, 604, 606, and 608 to heights 802, 804, 806, and 808, respectively. Heights 802, 804, 806, and 808 may be determined to reduce an amount of grass around obstacle 510 on path 512 not cut by cutting elements 602, 604, 606, and 608.

The illustrations provided in FIGS. 5-8 are not meant to imply physical or architectural limitations to the manner in which different illustrative embodiments can be implemented. For example, the sizes and dimensions in FIG. 5-8 may be increased or decreased depending on implementation.

Figure 9:
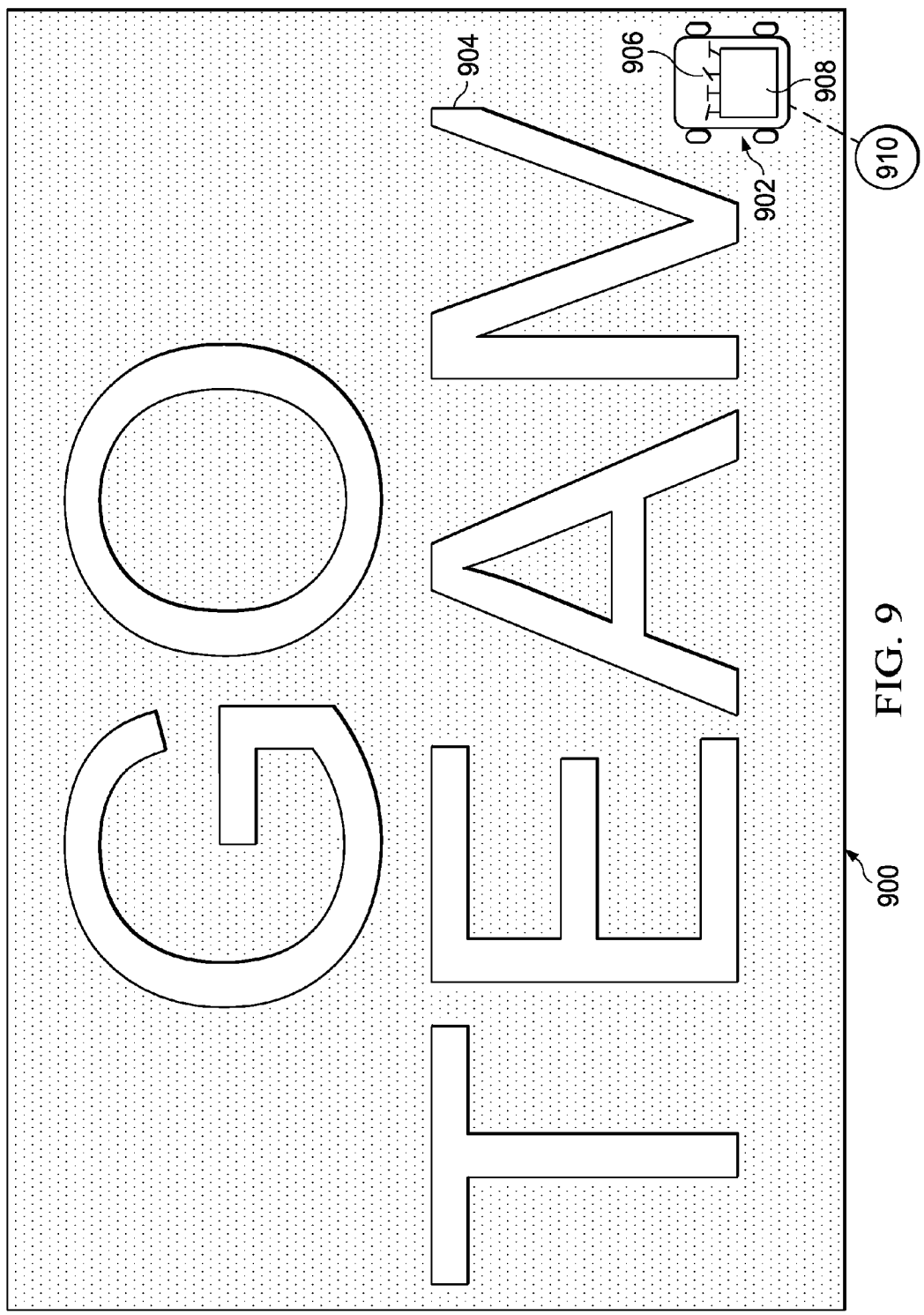
FIG. 9 is an illustration of a vehicle sculpting grass in accordance with an illustrative embodiment.

With reference now to FIG. 9, an illustration of a vehicle sculpting grass is depicted in accordance with an illustrative embodiment. In this illustrative example, Lawn 900 may be an example of worksite 102 in FIG. 1. As depicted, lawn 900 has vehicle 902 forming pattern 904 into lawn 900.

Vehicle 902 includes plurality of cutting elements 906. Plurality of cutting elements 906 may be controlled by control unit 908. As vehicle 902 moves over lawn 900, plurality of cutting elements form pattern 904 into lawn 900. For example, without limitation, pattern 904 may be formed in lawn 900 by selectively adjusting the height, cutting speed and/or angle of plurality of cutting elements 906 with respect to lawn 900. This may result in lawn 900 having grass of unequal lengths and/or shapes in certain portions. The unequal lengths of grass in certain portions may have an appearance of pattern 904 on lawn 900.

In this illustrative example, pattern 904 may be autonomously formed on lawn 900 with the use of program code 910, such as program code 318 in FIG. 3. Program code 910 may be stored on a computer readable storage device. Program code 910 may be configured, when executed by a processor, to cause control unit 908 to adjust the height, cutting speed, and/or angle of plurality of cutting elements 906. These adjustment instructions may be selectively configured in program code 910 to cause plurality of cutting elements 906 to form pattern 904 on lawn 900. For example, pattern 904 may be formed in lawn 900 while vehicle 902 is mowing lawn 900. Vehicle 902 may also form pattern 904 in lawn 900 without mowing all of lawn 900, for example.

Adjusting a cutting angle of plurality of cutting elements 906 may further allow for the sculpting of pattern 904 in lawn 900. For example, control unit 908 may receive instructions to adjust the cutting angle at which a number of cutting elements of plurality of cutting elements 906 cut with respect to the surface of lawn 900. This adjustment of the cutting angle may be used to form a beveled, sloped, and/or rounded appearance in an area of grass in lawn 900.

Additionally, pattern 904 may also be formed on lawn 900 through the dispersion of a coloring agent. Coloring agents may be stored in vehicle 902. For example, without limitation, coloring agents may include paint, dye, fertilizer and/or grass seed of a certain color, and/or any other item suitable for adding color to lawn 900. Control unit 908 may cause plurality of cutting elements 906 to disperse coloring agents to form pattern 904.

In this manner, program code 910 and/or control unit 908 may incorporate data from a navigational system and/or sensing system, such as navigational system 226 and/or sensing system 222 in FIG. 2. For example, without limitation, a global positioning system, dead reckoning, and/or radar may be used to determine a location of vehicle 902 on lawn 900. The data regarding the location of vehicle 902 on lawn 900 may be used in conduction with program code 910 to form pattern 904 on lawn 900.

In this illustrative example, program code 910 may be stored in vehicle 902. Alternatively, program code 910 may be stored in a database connected to vehicle 902 by a wireless connection. Further, program code 910 may be received from a data source, such as for example, server 104 and or client 108 in FIG. 1. For example, program code 910 may be downloaded from server 104 in FIG. 1 vehicle 902 and/or a separate database. Program code 910, for forming pattern 904 in lawn 900, may be one of a plurality of different program codes for forming a number of patterns in any of a number of lawns.

These different program codes may also be available to be downloaded over the internet to a data storage device.

Figure 10:
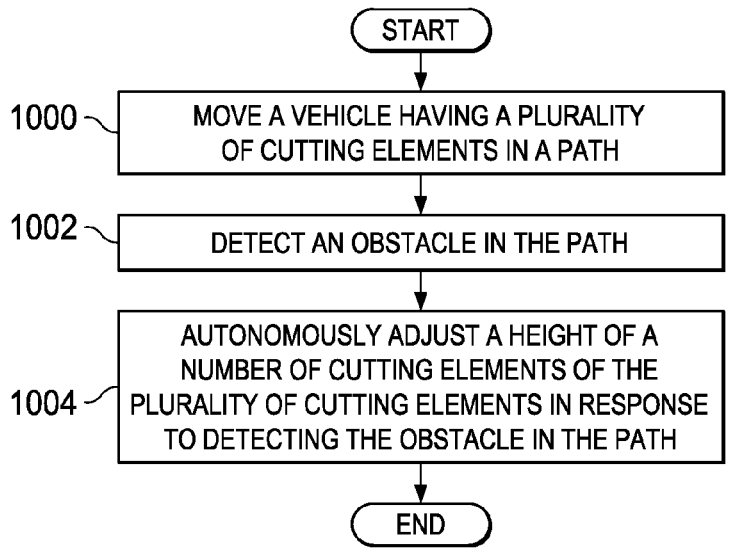
FIG. 10 is an illustration of a flowchart of a process for controlling cutting elements in a vehicle in accordance with an illustrative embodiment.

With reference now to FIG. 10, an illustration of a flowchart of a process for controlling cutting elements in a vehicle is depicted in accordance with an illustrative embodiment. The process illustrated in FIG. 10 may be implemented in a worksite management environment, such as worksite management environment 100 in FIG. 1.

The process begins by moving a vehicle having a plurality of cutting elements in a path (step 1000). In step 1000, the plurality of cutting elements may be used to cut items on the path. Thereafter, the process detects an obstacle in the path (step 1002). In step 1002, the obstacle may be detected by a sensing system such as sensing system 222 in FIG. 2. The sensing system may further detect a position of the obstacle in the path, a size of the obstacle in the path, and a distance between the number of cutting elements and the obstacle.

The process then autonomously adjusts a height of a number of cutting elements of the plurality of cutting elements in response to detecting the obstacle in the path (step 1004), with the process terminating thereafter. In step 1004, the height may be autonomously adjusted by a control unit, such as control unit 228 in FIG. 2. The autonomous adjustment of the height of the number of cutting elements may reduce an area around the obstacle that is not cut by the plurality of cutting elements.

Figure 11:
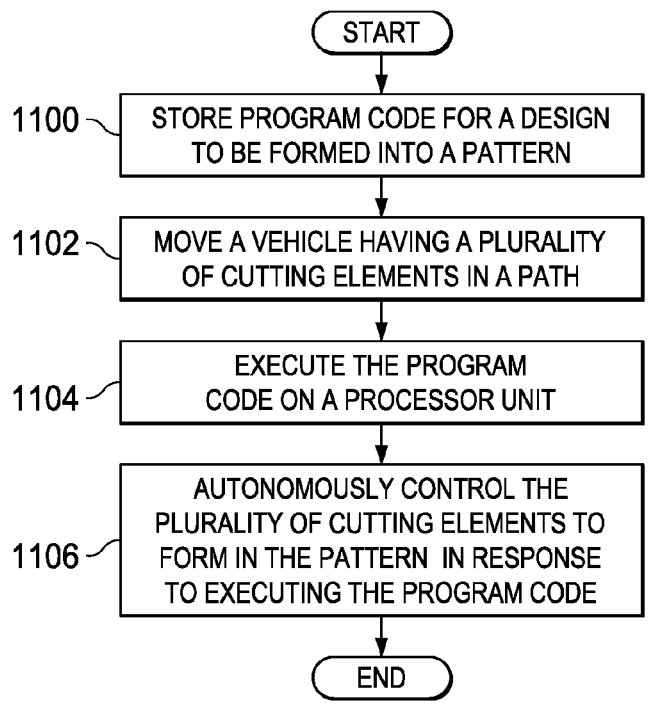
FIG. 11 is an illustration of a flowchart of a process for controlling cutting elements in a vehicle in accordance with an illustrative embodiment.

With reference now to FIG. 11, an illustration of a flowchart of a process for controlling cutting elements in a vehicle is depicted in accordance with an illustrative embodiment. The process illustrated in FIG. 11 may be implemented in a worksite management environment, such as worksite management environment 100 in FIG. 1.

The process begins by storing program code for a design to be formed into a pattern (step 1100). In step 1100, the program code for the design to be formed into the pattern may be transferred to a computer readable storage medium. The program code for the design to be formed into the pattern may be one of a number of program codes for a number of designs to be formed into a number of patterns. Thereafter, the process moves a vehicle having a plurality of cutting elements in a path (step 1102). In step 1102 the plurality of cutting elements may be used to cut items on the path.

The process then executes the program code on a processor unit (step 1104). The process then autonomously controls the plurality of cutting elements to form in the pattern in response to executing the program code (step 1106), with the process terminating thereafter. In step 1106, the program code, when executed by the processor unit, may be configured to cause a control element, such as control element 228 in FIG. 2, to autonomously adjust the plurality of cutting elements. The plurality of cutting elements may then be used to form the pattern on the path. The control element may also be configured to adjust the path of the cutting elements. For example, the program code, when executed, may cause the vehicle to move in an adjusted path. Adjusting the path may allow the plurality of cutting elements to form greater detail into the design.

Figure 12:
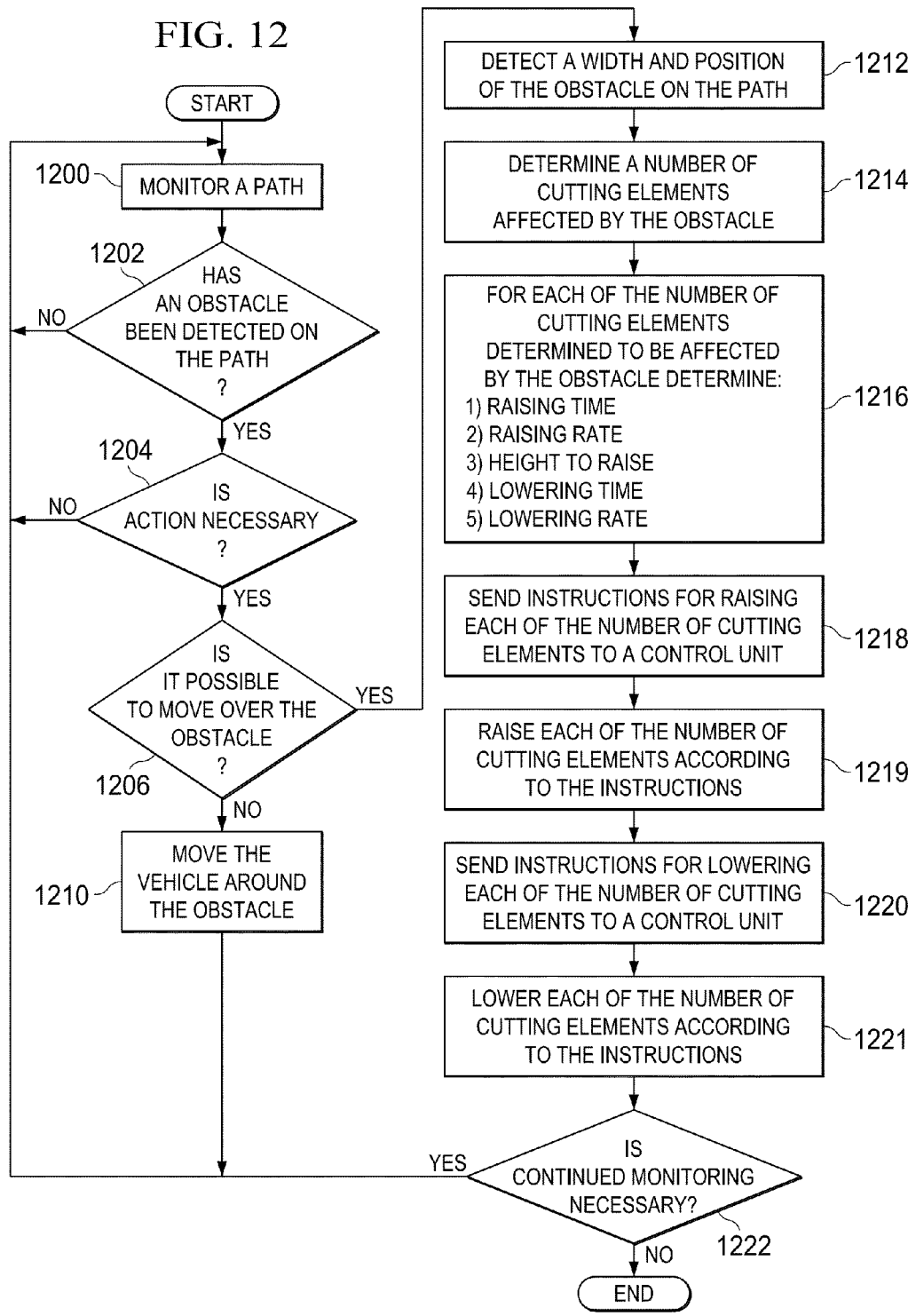
FIG. 12 is an illustration of a flowchart of a process for controlling cutting elements in a vehicle in accordance with an illustrative embodiment.

With reference now to FIG. 12, an illustration of a flowchart of a process for controlling cutting elements in a vehicle is depicted in accordance with an illustrative embodiment. The process illustrated in FIG. 12 may be implemented in a worksite management environment, such as worksite management environment 100 in FIG. 1.

The process begins by monitoring a path (step 1200). In step 1200, the path may be a path in front of a vehicle that the vehicle may move on. The monitoring of the path may be performed by a path monitoring system such as path monitoring system 402 in FIG. 4. The process then determines if an obstacle has been detected on the path (step 1202). In step 1202, an obstacle detection unit, such as obstacle detection unit 404, in FIG. 4 may be used to detect obstacles on the path. Any number of sensing devices may be used to detect obstacles on the path. If a determination is made that an obstacle has not been detected, the process monitors the path (step 1200).

If a determination is made that an obstacle has been detected on the path, the process then determines if action is necessary (step 1204). In step 1204, the determination if action is necessary may be made by a processor unit, such as processor unit 406 in FIG. 4. The determination may be based on data received regarding the size of the obstacle. For example, if the obstacle is smaller than a height that a plurality of cutting elements is above the path, then action may not be necessary. If a determination is made that action is not necessary, the process monitors the path (step 1200).

If a determination is made that action is necessary, the process then determines if it is possible to move over the obstacle (step 1206). In step 1206, this determination may be based on data regarding the size of the obstacle a maximum height the plurality of cutting elements may be raised in the vehicle. For example, if the obstacle is larger than the maximum height the plurality of cutting elements may be raised, then it may not be possible to move over the obstacle. If a determination is made that it is not possible to move over the obstacle, then the process moves the vehicle around the obstacle (step 1210). In step 1210, moving the vehicle around the obstacle may be performed by a navigational system and/or a control unit connected to the vehicle, such as navigation system 226 and/or control unit 228 in FIG. 2. The process monitors the path (step 1200).

If a determination is made that it is possible to move over the obstacle, the process then detects a width and a position of the obstacle on the path (step 1212). For example, in step 1212 this detection may be performed by a number of sensing devices such as sensing devices 405 in FIG. 4. Thereafter, the process determines a number of cutting elements affected by the obstacle (step 1214). In step 1214, this determination may be performed by a processor unit, such as processor unit 406 in FIG. 4. This determination may be based on data received regarding the width and the position of the object on the path, as well as data known about the configuration of each of the plurality of cutting elements in the vehicle. For example, a number of cutting elements affected may be the number of cutting elements that may contact the obstacle if the vehicle were to continue to move on the path.

The process then determines for each of the number of cutting elements determined to be affected by the obstacle a raising time, a raising rate, a height to raise, a lowering time, and a lowering rate (step 1216). In step 1216, these determinations may be performed by a processor unit, such as processor unit 406 in FIG. 4. These determinations may be based on data received regarding the size of the object on the path, the distance between the object and the vehicle, the speed of the vehicle, and/or any other available data. This data received may be acquired by a sensing system such as sensing system 400. Additionally, the data received may be data stored in a database, such as database 408 in FIG. 4.

The process then sends instructions for raising each of the number of cutting elements to a control unit (step 1218). In step 1218, the instructions may include a time, a height, and a rate for each of the number of cutting elements to be raised. The process then raises each of the number of cutting elements according to the instructions (step 1219). The control unit may be configured to raise each of the number of cutting elements according to the instructions.

Thereafter, the process sends instructions for lowering each of the number of cutting elements to a control unit (step 1220). In step 1220, the instructions may include a time, an amount, and a rate for each of the number of cutting elements to be lowered. The process then lowers each of the number of cutting elements according to the instructions (step 1221). The control unit may be configured to lower each of the number of cutting elements according to the instructions. The instructions for raising and lowering each of the number of cutting elements may be configured to reduce an area around the obstacle not cut by the plurality of cutting elements.

The process then determines if continued monitoring is necessary (step 1222). In step 1222, for example, continued monitoring may not be necessary if the vehicle is at rest or has completed a task. If a determination is made that continued monitoring is necessary, the process monitors the path (step 1200). If a determination is made that continued monitoring is not necessary, the process terminates thereafter.

Figure 13:
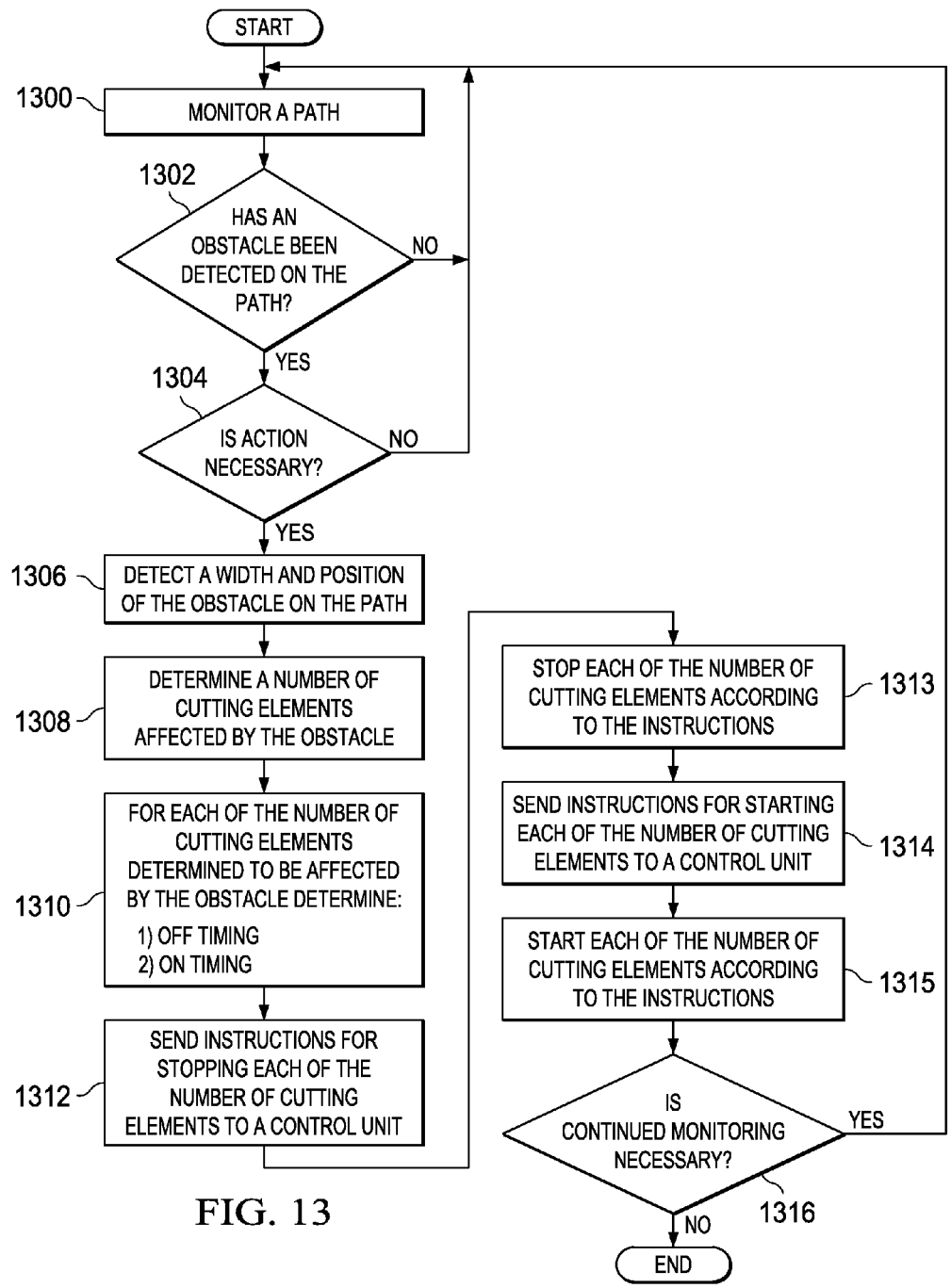
FIG. 13 is an illustration of a flowchart of a process for controlling cutting elements in a vehicle in accordance with an illustrative embodiment.

With reference now to FIG. 13, an illustration of a flowchart of a process for controlling cutting elements in a vehicle is depicted in accordance with an illustrative embodiment. The process illustrated in FIG. 13 may be implemented in a worksite management environment, such as worksite management environment 100 in FIG. 1.

The process begins by monitoring a path (step 1300). In step 1300, the path may be a path in front of a vehicle that the vehicle may move on. The process then determines if an obstacle has been detected on the path (step 1302).

If a determination is made that an obstacle has not been detected, the process monitors the path (step 1300). If a determination is made that an obstacle has been detected on the path, the process then determines if action is necessary (step 1304).

If a determination is made that action is not necessary, the process monitors the path (step 1300). If a determination is made that action is necessary, the process then detects a width and a position of the obstacle on the path (step 1306). Thereafter, the process determines a number of cutting elements affected by the obstacle (step 1308).

The process then determines for each of the number of cutting elements determined to be affected by the obstacle an off timing and an on timing (step 1310). In step 1310, these determinations may be performed by a processor unit, such as processor unit 406 in FIG. 4. These determinations may be based on data received regarding the size of the object on the path, the distance between the object and the vehicle, the speed of the vehicle, the time needed for the number of cutting elements to be stopped from cutting and/or any other available data. This data received may be acquired by a sensing system such as sensing system 400. Additionally, the data received may be data stored in a database, such as database 408 in FIG. 4.

The process then sends instructions for stopping each of the number of cutting elements to a control unit (step 1312). In step 1312, the instructions may include a timing for each of the number of cutting elements to be stopped. The process then stops each of the number of cutting elements according to the instructions (step 1313). The control unit may be configured to stop each of the number of cutting elements according to the instructions.

Thereafter, the process sends instructions for starting each of the number of cutting elements to a control unit (step 1314). In step 1314, the instructions may include a timing for each of the number of cutting elements to be started. The process then starts each of the number of cutting elements according to the instructions (step 1315). The control unit may be configured to start each of the number of cutting elements according to the instructions. The instructions for stopping and starting each of the number of cutting elements may be configured to reduce an area around the obstacle not cut by the plurality of cutting elements.

The process then determines if continued monitoring is necessary (step 1316). In step 1316, for example, continued monitoring may not be necessary if the vehicle is at rest or has completed a task. If a determination is made that continued monitoring is necessary, the process monitors the path (step 1300). If a determination is made that continued monitoring is not necessary, the process terminates thereafter.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for an autonomous cutting element for sculpting grass. In one illustrative embodiment, the cutting elements are configured to autonomously avoid contacting obstacles that may cause harm to the cutting element or the obstacle. The cutting elements are configured to autonomously reduce an area around the obstacle that is not cut by the cutting elements. This reduced area reduces the need for additional management. In another illustrative embodiment, the cutting elements are configured to autonomously form patterns.

The description of the different illustrative embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
    a vehicle movable in a path, the vehicle having a first number of cutting elements;
    a sensing unit for detecting an obstacle in the path;
    a control unit connected to the first number of cutting elements, the control unit being configured to autonomously adjust a height of a second number of cutting elements of the first number of cutting elements; and
    a processor unit operatively coupled to the control unit and configured to determine, in response to the sensing unit detecting the obstacle in the path, the second number of cutting elements to be autonomously adjusted, a height for each of the second number of cutting elements to be autonomously adjusted, and a timing for each of the second number of cutting elements to be autonomously adjusted, wherein the second number of cutting elements comprise more than one cutting element.

2. The apparatus of claim 1, wherein the sensing unit is configured to detect a position of the obstacle in the path, a size of the obstacle in the path, and a distance between the second number of cutting elements and the obstacle, and wherein the control unit is configured to individually control a height of each individual cutting element of the second number of cutting elements.

3. The apparatus of claim 2 further comprising:
a navigation system for autonomously controlling navigation of the vehicle along the path.

4. The apparatus of claim 3, wherein the processor unit is configured to determine a first time for the control unit to autonomously raise each of the second number of cutting elements and a second time for the control unit to autonomously lower each of the second number of cutting elements, wherein each cutting element of the second number of cutting elements are coplanar with respect to one another.

5. The apparatus of claim 3, wherein the determination of the second number of cutting elements to be autonomously adjusted, the height for each of the second number of cutting elements to be autonomously adjusted, and the timing for each of the second number of cutting elements to be autonomously adjusted at least reduces one of an area around the obstacle that is not cut by the first number of cutting elements, an obviousness of the area around the obstacle, and a visibility of the obstacle.

6. The apparatus of claim 1, wherein the sensing unit comprises a number of sensors selected from at least one of a global positioning system, structured light sensor, two dimensional/three dimensional lidar, dead reckoning, infrared camera, visible light camera, radar, ultrasonic sonar, radio frequency identification reader, moisture sensor, and ambient light sensor.

7. The apparatus of claim 1, wherein the control unit is configured to stop the second number of cutting elements of the first number of cutting elements in response to the sensing unit detecting the obstacle in the path of the vehicle.

8. The apparatus of claim 1, wherein the control unit is configured to adjust a cutting angle of the second number of cutting elements of the first number of cutting elements in response to the sensing unit detecting the obstacle in the path of the vehicle, wherein the first number of cutting elements and the second number of cutting elements are located underneath the vehicle.

9. An apparatus comprising:
a vehicle movable in a path, the vehicle having a first number of cutting elements;
a sensing unit for detecting an obstacle in the path;
a control unit connected to the first number of cutting elements, the control unit being configured to autonomously adjust a height of a second number of cutting elements of the first number of cutting elements in response to the sensing unit detecting the obstacle in the path;
a computer readable storage medium storing program code for a design to be formed into a pattern, and
a processor unit, wherein the processor unit executes the program code and wherein the program code, when executed by the processor unit, causes the control unit to autonomously control the first number of cutting elements to form the pattern.

10. The apparatus of claim 9, wherein the program code for the design to be formed into the pattern is one of a number of program codes for a number of designs to be formed into a number of patterns, and wherein the number of program codes is transferred to the computer readable storage medium from a data source.

11. A method of controlling cutting elements in a vehicle, the method comprising:
autonomously moving a vehicle having a first number of cutting elements in a path;
detecting an obstacle in the path; and
responsive to detecting the obstacle in the path, autonomously adjusting a height of a second number of cutting elements of the first number of cutting elements.

12. The method of claim 11 further comprising:
detecting a position of the obstacle in the path;
detecting a size of the obstacle in the path; and
detecting a distance between the second number of cutting elements and the obstacle, and wherein the control unit is configured to individually control a height of each individual cutting element of the second number of cutting elements, wherein the second number of cutting elements is (i) a subset of the first number of cutting elements and (ii) comprise more than one cutting element.

13. The method of claim 12 further comprising:
responsive to detecting the position of the obstacle in the path, the size of the obstacle in the path, and the distance between the second number of cutting elements and the obstacle; determining the second number of cutting elements to be autonomously adjusted, a height for each of the second number of cutting elements to be autonomously adjusted, and a timing for each of the second number of cutting elements to be autonomously adjusted.

14. The method of claim 13 further comprising:
determining a first time for the control unit to autonomously raise each of the second number of cutting elements; and
determining a second time for the control unit to autonomously lower each of the second number of cutting elements.

15. The method of claim 13 further comprising:
responsive to determining the second number of cutting elements to be autonomously adjusted, the height for each of the second number of cutting elements to be autonomously adjusted, and the timing for each of the second number of cutting elements to be autonomously adjusted; reducing at least one of an area around the obstacle that is not cut by the first number of cutting elements, an obviousness of the area around the obstacle, and a visibility of the obstacle.

16. The method of claim 11, wherein the step of detecting an obstacle in the path of the vehicle is performed by a sensing unit and wherein the sensing unit comprises a number of sensors selected from at least one of a global positioning system, structured light sensor, two dimensional/three dimensional lidar, dead reckoning, infrared camera, visible light camera, radar, ultrasonic sonar, radio frequency identification reader, moisture sensor, and ambient light sensor.

17. The method of claim 11 further comprising:
responsive to detecting the obstacle in the path of the vehicle, stopping the second number of cutting elements of the first number of cutting elements.

18. The method of claim 11 further comprising:
responsive to detecting the obstacle in the path of the vehicle, adjusting a cutting angle of the second number of cutting elements of the first number of cutting elements.

19. A method of controlling cutting elements in a vehicle, the method comprising:
  moving a vehicle having a first number of cutting elements in a path;
  detecting an obstacle in the path;
  responsive to detecting the obstacle in the path, autonomously adjusting a height of a second number of cutting elements of the first number of cutting elements;
  storing program code for a design to be formed into a pattern;
  executing, by a processor unit, the program code; and
  responsive to executing the program code, autonomously controlling the first number of cutting elements to form in the pattern.

20. The method of claim 19 further comprising:
  transferring the program code for a design to be formed into a pattern to a computer readable storage medium, wherein the program code for the design to be formed into the pattern is one of a number of program codes for a number of designs to be formed into a number of patterns.

21. A computer program product comprising:
  a computer readable storage medium;
  program code, stored on the computer readable storage medium, for moving a vehicle having a first number of cutting elements in a path, detecting an obstacle in the path; and autonomously adjusting a height of a second number of cutting elements of the first number of cutting elements in response to detecting the obstacle in the path.

22. The computer program product of claim 21, further comprising:
  program code for detecting a position of the obstacle in the path, detecting a size of the obstacle in the path, and detecting a distance between the second number of cutting elements and the obstacle, wherein the second number of cutting elements comprise more than one cutting element, and wherein the program code is configured to individually control a height of each individual cutting element of the second number of cutting elements.

23. The computer program product of claim 22 further comprising:
  program code for determining the second number of cutting elements to be autonomously adjusted, a height for each of the second number of cutting elements to be autonomously adjusted, and a timing for each of the second number of cutting elements to be autonomously adjusted in response to detecting the position of the obstacle in the path, the size of the obstacle in the path, and the distance between the second number of cutting elements and the obstacle.

24. The computer program product of claim 23 further comprising:
  program code for determining a first time for the control unit to autonomously raise each of the second number of cutting elements and determining a second time for the control unit to autonomously lower each of the second number of cutting elements.

25. The computer program product of claim 23 further comprising:
  program code for reducing at least one of an area around the obstacle that is not cut by the first number of cutting elements, an obviousness of the area around the obstacle, and a visibility of the obstacle; in response to determining the second number of cutting elements to be autonomously adjusted, the height for each of the second number of cutting elements to be autonomously adjusted, and the timing for each of the second number of cutting elements to be autonomously adjusted.

26. The computer program product of claim 21 further comprising:
  program code for a design to be formed into a pattern; and
  program code for autonomously controlling the first number of cutting elements to form the pattern.

27. The computer program product of claim 26 further comprising:
  program code for transferring the program code for the design to be formed into a pattern to the computer readable storage medium, wherein the program code for the design to be formed into the pattern is one of a number of program codes for a number of designs to be formed into a number of patterns.

28. The computer program product of claim 21, wherein the program code for detecting the obstacle in the path is performed by a sensing unit comprising a number of sensors selected from at least one of a global positioning system, structured light sensor, two dimensional/three dimensional lidar, dead reckoning, infrared camera, visible light camera, radar, ultrasonic sonar, radio frequency identification reader, moisture sensor, and ambient light sensor.

29. The computer program product of claim 21 further comprising:
  program code for stopping the second number of cutting elements of the first number of cutting elements in response to detecting the obstacle in the path of the vehicle.

30. The computer program product of claim 21 further comprising:
  program code for adjusting a cutting angle of the second number of cutting elements of the first number of cutting elements in response to detecting the obstacle in the path of the vehicle.

31. A vehicle comprising:
  a plurality of cutting elements, wherein the vehicle is movable on a path;
  a sensing unit configured to detect an obstacle in the path, a position of the obstacle in the path, a size of the obstacle in the path, and a distance between the plurality of cutting elements and the obstacle;
  a processor unit configured to determine a number of cutting elements to be autonomously adjusted, a height for each of the number of cutting elements to be autonomously adjusted, and a timing for each of the number of cutting elements to be autonomously adjusted; and
  a control unit connected to the plurality of cutting elements, the control unit being configured to autonomously adjust each of the number of cutting elements of the plurality of cutting elements according to the height and the timing determined for each of the number of cutting elements, wherein the control unit is configured to individually control a height of each individual cutting element of the second number of cutting elements, wherein the second number of cutting elements is (i) a subset of the first number of cutting elements and (ii) comprise more than one cutting element.

32. The vehicle of claim 31 further comprising:
  a computer readable storage medium storing program code for a design to be formed into a pattern, and
  wherein the processor unit executes the program code and wherein the program code, when executed by the processor unit, causes the control unit to autonomously control the plurality of cutting elements to form the pattern.

33. The vehicle of claim 32, wherein the program code for the design to be formed into the pattern is one of a number of program codes for a number of designs to be formed into a number of patterns, and wherein the number of program codes is transferred to the computer readable storage medium from a data source.

34. The vehicle of claim 31, wherein the control unit is configured to stop the number of cutting elements of the plurality of cutting elements in response to the sensing unit detecting the obstacle in the path of the vehicle.

35. The apparatus of claim 31, wherein the control unit is configured to adjust a cutting angle of the number of cutting elements of the plurality of cutting elements in response to the sensing unit detecting the obstacle in the path of the vehicle.

* * * * *